US 6,546,640 B2

(12) United States Patent
Okada et al.

(10) Patent No.: US 6,546,640 B2
(45) Date of Patent: Apr. 15, 2003

(54) TRAVERSE LINEARITY COMPENSATION METHOD AND ROTATIONAL ACCURACY COMPENSATION METHOD OF MEASURING DEVICE

(75) Inventors: Eiji Okada, Kure (JP); Yoshiyuki Omori, Kure (JP); Atsushi Tsuruta, Kure (JP); Tsukasa Kojima, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 54 days.

(21) Appl. No.: 09/759,356

(22) Filed: Jan. 16, 2001

(65) Prior Publication Data

US 2001/0008047 A1 Jul. 19, 2001

(30) Foreign Application Priority Data

Jan. 18, 2000 (JP) ........................................ 2000-008989
Jan. 18, 2000 (JP) ........................................ 2000-008990

(51) Int. Cl.⁷ ................................................. G01B 5/03
(52) U.S. Cl. .............................. 33/503; 33/502; 73/1.79
(58) Field of Search ...................... 33/503, 502; 73/1.79

(56) References Cited

U.S. PATENT DOCUMENTS

| 4,945,501 A | * | 7/1990 | Bell et al. ..................... 33/503 |
| 5,134,781 A | * | 8/1992 | Baker ........................... 33/502 |
| 5,426,861 A | * | 6/1995 | Shelton ......................... 33/502 |
| 5,501,096 A | * | 3/1996 | Stettner et al. ................. 33/503 |
| 6,092,411 A | * | 7/2000 | Tokoi ........................... 73/1.79 |

FOREIGN PATENT DOCUMENTS

| JP | 2-75905 | 3/1990 |
| JP | 2935603 | 6/1999 |

* cited by examiner

*Primary Examiner*—Christopher W. Fulton
(74) *Attorney, Agent, or Firm*—Oliff & Berridge, PLC

(57) ABSTRACT

A compensation method according to the present invention includes: a traverse linearity data calculating step for measuring a master workpiece (MW) of which profile data is value-specified in advance while moving a sensor (7) using a linear movement mechanism (4, 5) of a measuring device (1) and for subtracting the previously value-specified profile data from the measurement data of the master workpiece to obtain a traverse linearity data of the linear movement mechanism; a workpiece measurement data calculating step for measuring the workpiece while moving the sensor by the linear movement mechanism of the measuring device to obtain a measurement data of the workpiece; and a workpiece profile calculating step for subtracting the traverse linearity data from the workpiece measurement data to obtain a true value data of the workpiece.

7 Claims, 11 Drawing Sheets

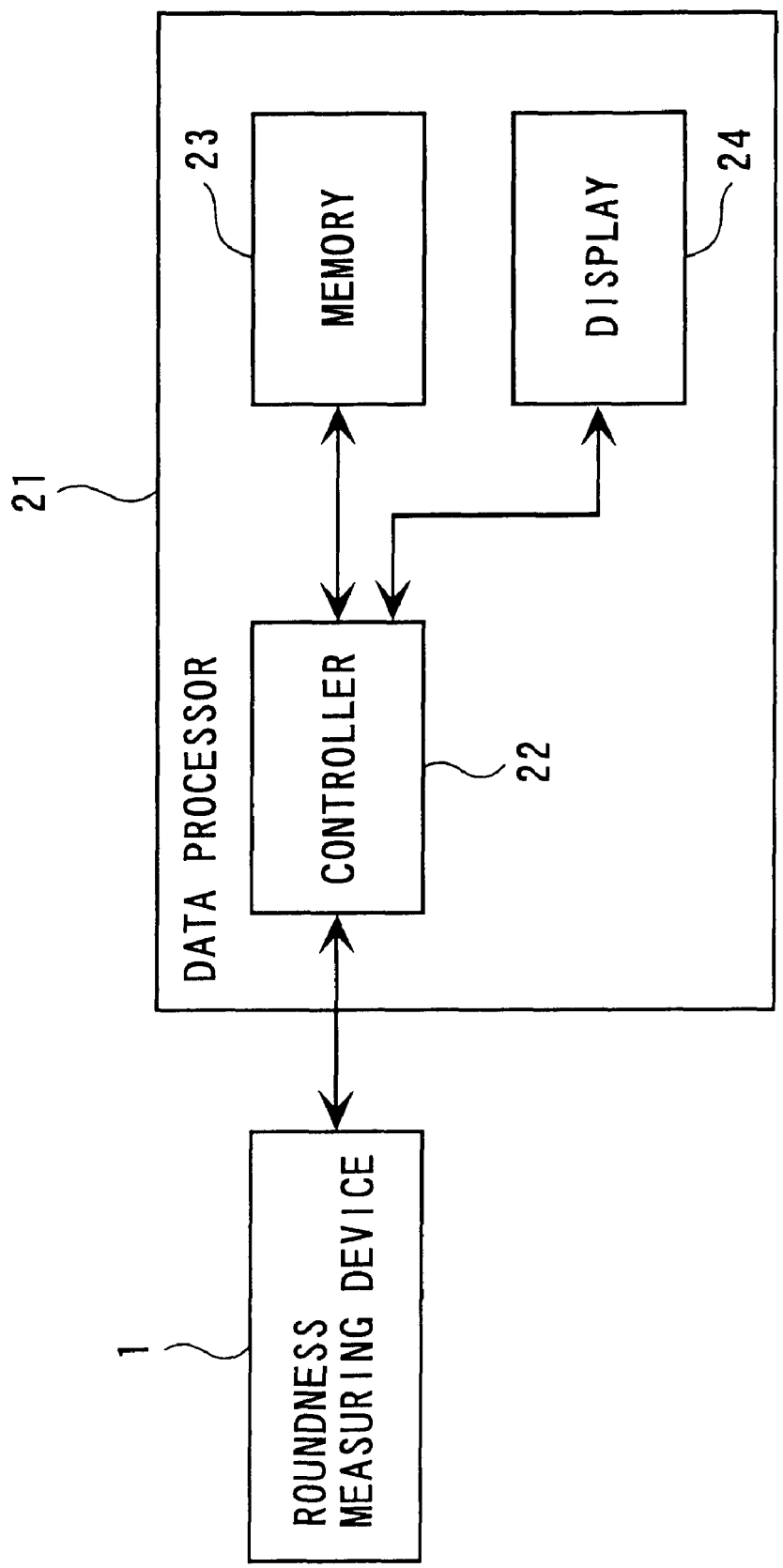

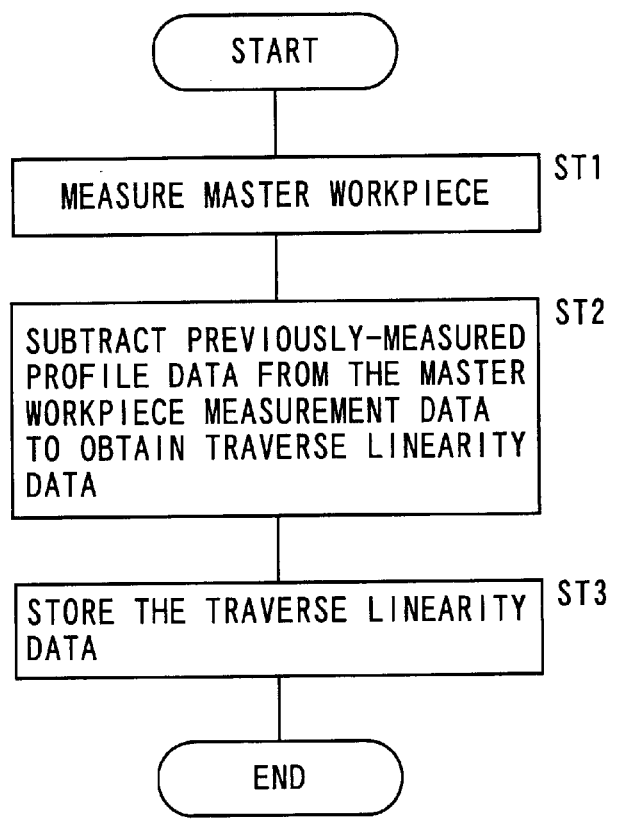
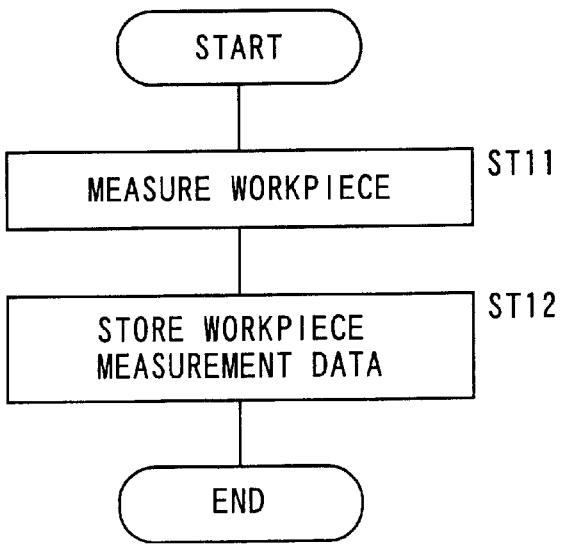

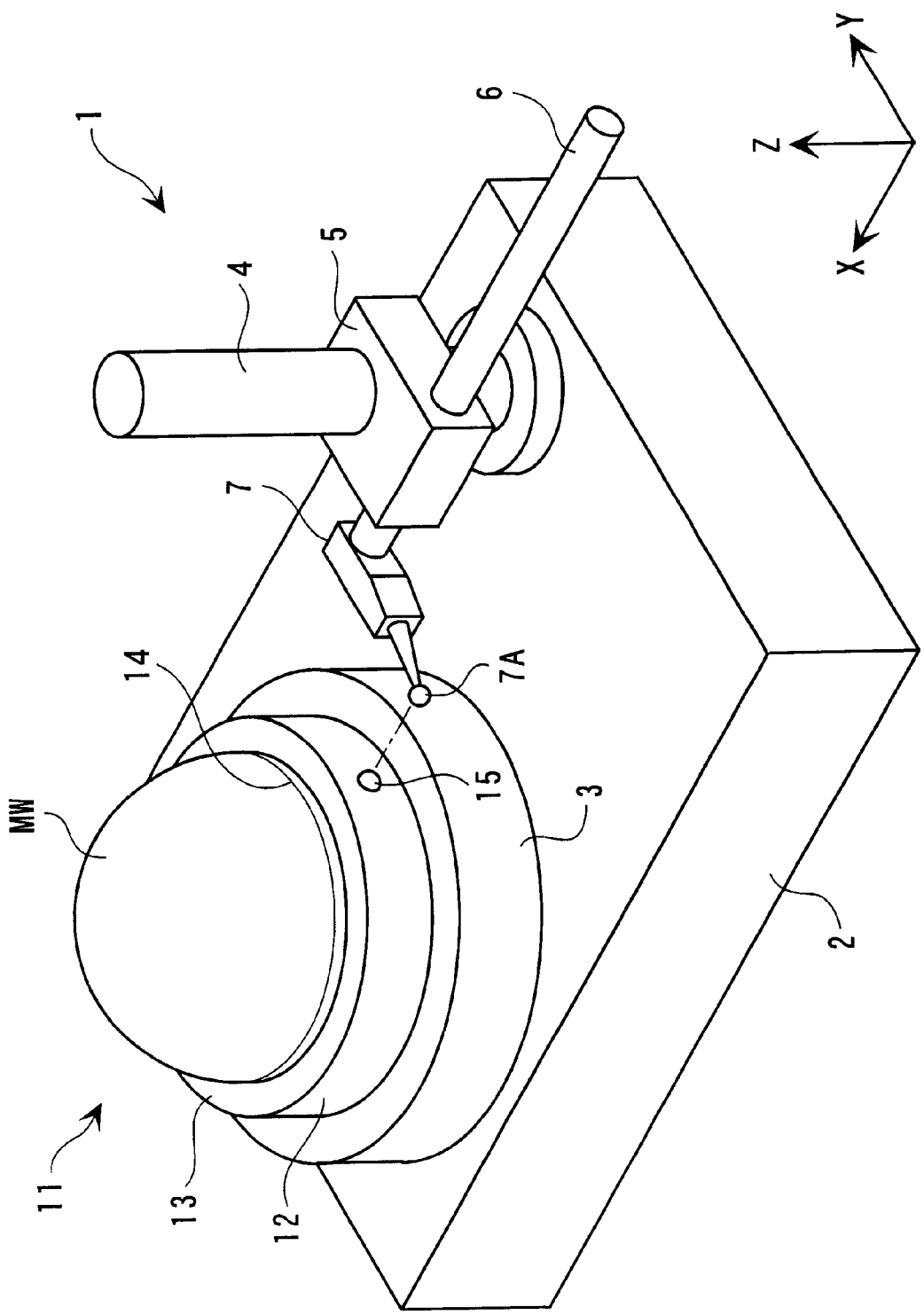

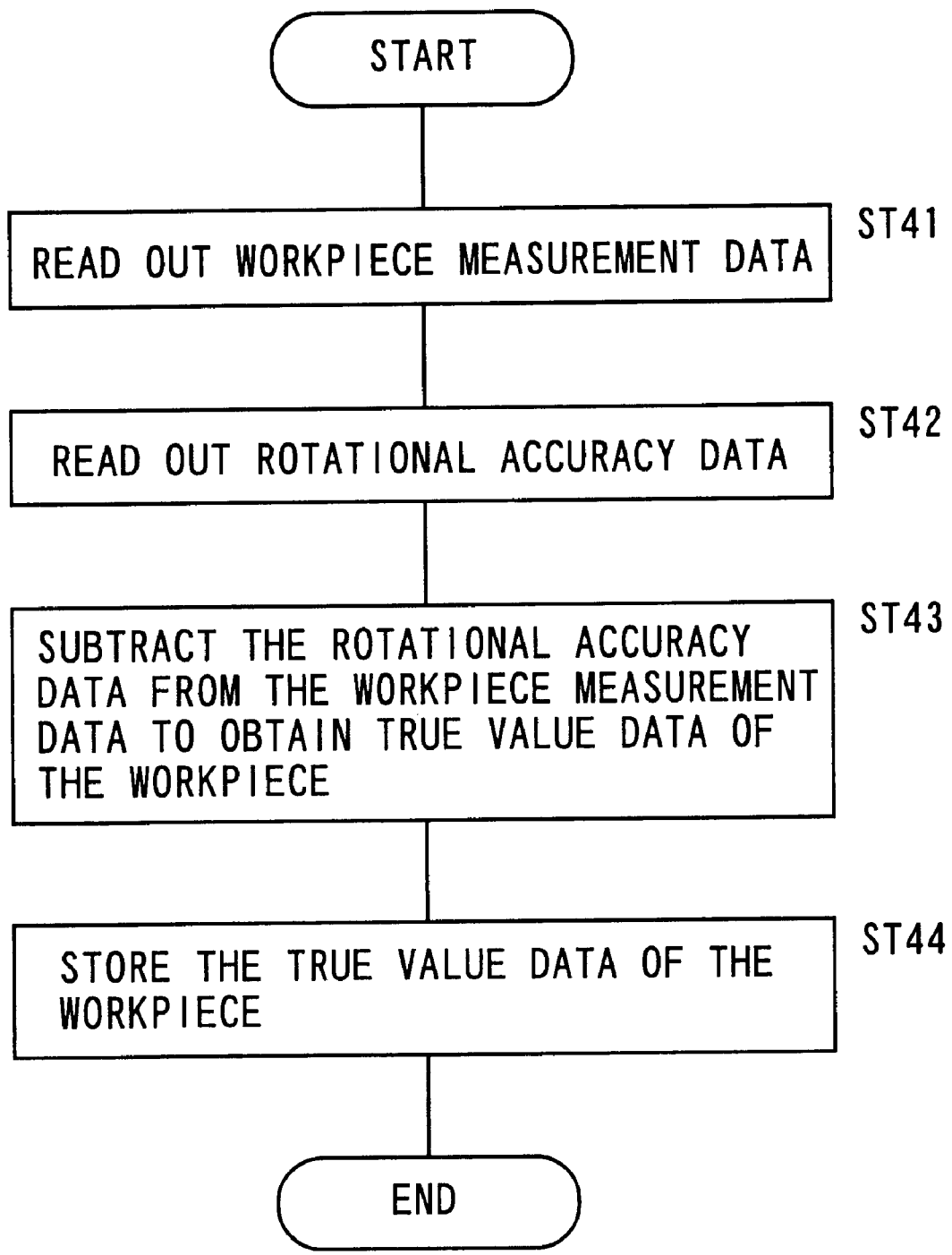

F I G. 13(A)
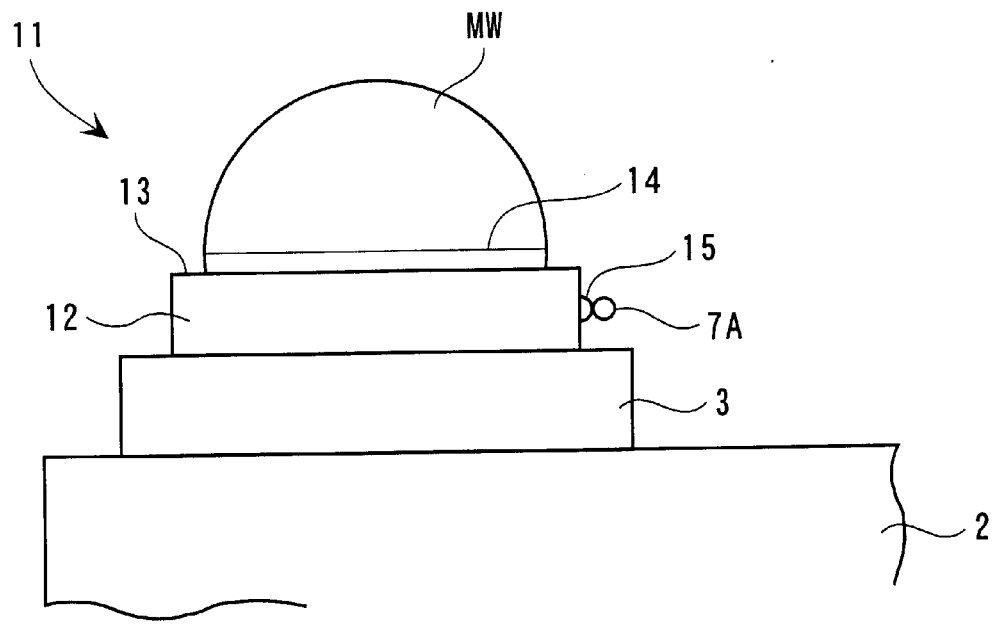
F I G. 13(B)
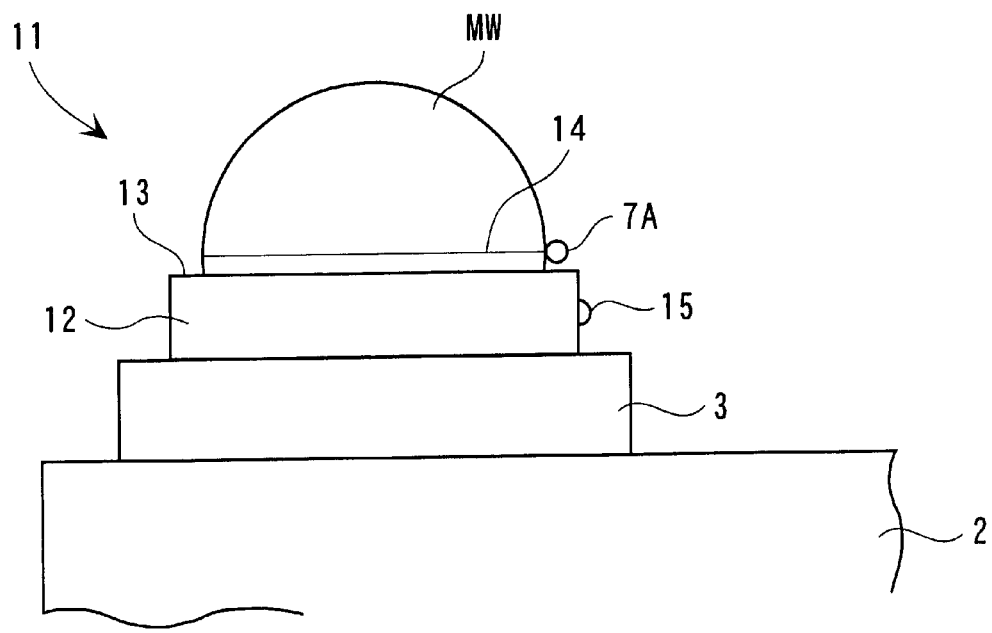

TRAVERSE LINEARITY COMPENSATION METHOD AND ROTATIONAL ACCURACY COMPENSATION METHOD OF MEASURING DEVICE

BACKGROUND OF THE INVENTION

1. Field of the Invention

The present invention relates to a traverse linearity compensation method and a rotational accuracy compensation method of a measuring device. More specifically, it relates to a traverse linearity compensation method of a measuring device having a linear movement mechanism, such as a roundness-measuring device and a roughness-measuring device, for compensating traverse linearity of the linear movement mechanism. It also relates to a rotational accuracy compensation method of a measuring device having a rotary mechanism such as a roundness-measuring device for compensating a rotational accuracy of the rotation mechanism.

2. Description of Related Art

When a workpiece is measured by a measuring device having a linear movement mechanism as a guide (reference) such as a roundness-measuring device and a roughness-measuring device, the resulted measurement data is a composition of a profile data of the workpiece and a mechanical accuracy of the linear movement mechanism (traverse linearity).

Similarly, when a workpiece is measured by a measuring device having a rotary mechanism as a guide (reference) such as a roundness-measuring device, the resulted measurement data is a composition of a profile data of the workpiece and the mechanical accuracy of the rotary mechanism (rotational accuracy).

In order to obtain a correct workpiece profile against the mechanical accuracy of the linear movement mechanism and the rotary mechanism, the traverse linearity of the linear movement mechanism or the rotational accuracy of the rotary mechanism has to be separated and removed from the measurement data.

Conventionally, a "straightness measurable roundness-measuring device", Japanese Patent No. 2935603, has been proposed for separating and removing the traverse linearity of the linear movement mechanism from the measurement data.

The device has a rotary table for mounting a traverse linearity check gauge, a sensor for detecting a surface position of a side of the traverse linearity check gauge, a column for movably holding the sensor along the surface of the traverse linearity check gauge, a first storing means for storing data obtained by the sensor as a first data, a second storing means for storing data as a second data obtained by rotating the traverse linearity check gauge around a rotational axis of the rotary table by 180 degrees and by sensing the surface position of the same side of the traverse linearity check gauge, and a processor for calculating a linearity error compensation amount of the column based on the first data and the second data.

Since the above-described "straightness measurable roundness-measuring device", Japanese Patent No. 2935603 employs so-called reversal method, which requires an initial measurement (the first measurement) and the second measurement conducted after rotating the rotary table by 180 degrees, and where the measurement locus has to be identical on the target workpiece surface, following problems accompanied.

It is extremely difficult to correctly set the workpiece during measurement and the setting requires skill. In addition, considerable number of steps, such as reversing the location of the sensor in conducting the two measurements is necessary therefor. Further, the guide of the sensor is not always in the regular condition (for instance, in the roundness measuring device, projection amount of an arm holding the sensor is not always the same), so that error is likely to be caused.

On the other hand, the following method is known for separating and removing the rotational accuracy of the rotary mechanism.

[Method 1] A spherical master workpiece having smooth surface, for instance, semispherical master workpiece (reference hemisphere) is measured and resulted measurement data is separated and removed from the workpiece measurement data as the rotational accuracy.

[Method 2] Phase difference method (multi step method), where measurement is conducted while shifting phase of a reference hemisphere by a predetermined pitch relative to a rotary table.

However, following problems occur in the above-described [method 1] and [method 2].

Since the reference hemisphere has its inherent profile error, reliability of [method 1] is not so high.

In [method 2], the reference hemisphere has to be measured while being shifted by a predetermined pitch relative to the rotary table. In order to shift the phase accurately, specially designed jig and skilled technique are required and a larger number of steps are required as the divisional number of the shift amount is increased.

SUMMARY OF THE INVENTION

An object of the present invention is to provide a traverse linearity compensation method capable of overcoming the above-described disadvantage of the reversal method and obtaining highly reliable measurement data without modifying existing devices.

A traverse linearity compensation method of a measuring device according to the present invention employs following arrangement for achieving the above object.

The present invention is a traverse linearity compensation method of a measuring device having a linear movement mechanism, the method including: a traverse linearity data calculating step for measuring a master workpiece of which profile data is value-specified in advance while moving a sensor by the linear movement mechanism of the measuring device and for subtracting the value-specified profile data from the master workpiece measurement data to obtain a traverse linearity data of the linear movement mechanism; a workpiece measurement data calculating step for measuring a workpiece while moving the sensor by the linear movement mechanism of the measuring device to obtain a measurement data of the workpiece; and a workpiece profile calculating step for subtracting the traverse linearity data from the workpiece measurement data to obtain a true value data of the workpiece.

According to the above arrangement, the master workpiece of which profile data is value-specified in advance is measured while moving the sensor by the linear movement mechanism of the measuring device the traverse linearity data of the linear movement mechanism is obtained by subtracting the previously measured profile data from the master workpiece measurement data during the traverse linearity data calculating step. Subsequently, during the workpiece profile calculating step, the workpiece is measured while moving the sensor by the linear movement mechanism of the measuring device to obtain the workpiece measurement data. During the workpiece profile calculating step, the true value data of the workpiece is obtained by subtracting the traverse linearity data from the workpiece measurement data.

Accordingly, since only one measurement is necessary during the traverse linearity data calculating step, the disadvantage of the reversal method can be solved. Further, since the sensor guide is not required to be the same, more accurate compensation result can be obtained. Further, since the compensation is conducted by processing the workpiece measurement data, highly reliable measurement data can be obtained without special arrangement for the measuring device. Further, since the calculation of the traverse linearity data and the compensation of the traverse linearity data to the workpiece measurement data can be conducted by an application program independent of the measuring device, the data can be more accurately compensated by conducting processing such as averaging processing of the master workpiece measurement data (processing for obtaining average value of a plurality of master workpiece measurement data obtained by repeatedly measuring the same position under the same condition) for reducing electric noise and dispersion of the measurement data according to measurement environment.

In a traverse linearity compensation method of a measuring device having a linear movement mechanism according to the present invention, the method may include: a traverse linearity data calculating step for measuring a master workpiece of which profile data is value-specified in advance while moving a sensor by the linear movement mechanism of the measuring device and for subtracting the value-specified profile data from the master workpiece measurement data to obtain a traverse linearity data of the linear movement mechanism; a traverse linearity data storing step for storing the traverse linearity data obtained in the traverse linearity data calculating step; a workpiece measurement data calculating step for measuring a workpiece while moving the sensor by the linear movement mechanism of the measuring device to obtain a measurement data of the workpiece; a workpiece measurement data storing step for storing the workpiece measurement data obtained in the workpiece measurement data storing step; and a workpiece profile calculating step for reading out the stored workpiece measurement data and the traverse linearity data stored in the respective storing steps and for subtracting the traverse linearity data from the workpiece measurement data to obtain a true value data of the workpiece.

According to the above arrangement, since the traverse linearity data storing step for storing the traverse linearity data and the workpiece measurement data storing step for storing the workpiece measurement data are added, the traverse linearity data and the workpiece measurement data can be acquired and stored at different time point and the true value data of the workpiece can be obtained by subtracting the traverse linearity data from the workpiece measurement data as desired (as necessary).

In the traverse linearity compensation method according to the present invention, a measurement jig having a mount provided with a workpiece mounting surface and an origin-setting reference ball buried in the mount or the master workpiece with a part thereof being exposed may preferably be used in the traverse linearity data calculating step, and, after a square-pillar master workpiece is rested on the workpiece mounting surface of the mount and a measurement origin is set by locating the sensor of the measuring device on a vertex of the reference ball, the sensor may be moved along a side of the master workpiece by the linear movement mechanism to measure the master workpiece.

According to the above arrangement, since the master workpiece is measured using the measurement jig having the mount and the origin-setting reference ball and, after the measurement origin is set by locating the sensor of the measuring device to the origin-setting reference ball, the master workpiece is measured while moving the sensor along the measurement surface of the master workpiece by the linear movement mechanism, the sensor can be accurately moved from the measurement origin to the designated measurement point of the master workpiece, so that the master workpiece can be measured highly accurately.

In the traverse linearity compensation method of a measuring device according to the present invention, the mount may preferably be formed in a half-cylinder having a vertical reference surface orthogonal with the workpiece mounting surface, the reference ball being buried on the vertical reference surface with a part thereof being exposed.

According to the above arrangement, in compensating the traverse linearity (traverse linearity of a column or slider for vertically moving the sensor) of a roundness measuring device, the mount is set on a rotary table so that the vertical reference surface of the mount is situated at the center of the rotary table of the roundness measuring device, and subsequently, after the master workpiece is rested on the workpiece mounting surface of the mount so that one side of the master workpiece coincides with the vertical reference surface of the mount, the probe of the sensor is brought into contact with the reference ball and the position of the sensor is adjusted in order that the probe captures the vertex of the reference ball both in vertical and in horizontal direction. After setting the measurement origin at the condition, the probe of the sensor is brought into contact with one point on the surface of the master workpiece a predetermined distance away from the measurement origin, and the sensor is moved upwardly (or downwardly), thus measuring the vertical traverse linearity of the master workpiece on the entire length.

Accordingly, since the master workpiece can be located on the rotary table using the measurement jig and the measurement origin can be set by bringing the probe of the sensor into contact with the reference ball, the probe of the sensor can be constantly located at a regular position of the master workpiece, so that the locus from the regular position on the master workpiece can be measured.

Another object of the present invention is to provide a rotational accuracy compensation method of a measuring device capable of overcoming the disadvantage of the above-described conventional measuring method, especially the phase-difference method, and obtaining highly reliable measurement data without modifying the existing device.

Accordingly, in order to attain the above object, the rotational accuracy compensation method according to the present invention employs following arrangement.

A rotational accuracy compensation method of a measuring device according to the present invention is a rotational accuracy compensation method of a measuring device having a rotary mechanism, the method including: a rotational accuracy data calculating step for measuring a profile of a master workpiece by a sensor while rotating a master workpiece of which profile data at a data acquisition position is value-specified in advance by a rotary mechanism of the measuring device and for subtracting the value-specified profile data from the master workpiece measurement data to obtain a rotational accuracy data of the rotary mechanism; a workpiece measurement data calculating step for measuring the profile of the workpiece by the sensor while rotating the workpiece by the rotary mechanism of the measuring device to obtain a measurement data of the workpiece; and a workpiece profile calculating step for subtracting the rotational accuracy data from the workpiece measurement data to obtain a true value data of the workpiece.

According to the above arrangement, while rotating the master workpiece of which profile data at the data acquisition position is value-specified by a rotary mechanism of the measuring device, the profile of the master workpiece at the data acquisition position is measured by the measuring device and the rotational accuracy data of the rotary mechanism is obtained by subtracting the value-specified profile data from the master workpiece measurement data during the rotational accuracy data calculating step. During the workpiece measurement data calculating step, the profile of the workpiece is measured by the sensor while rotating the workpiece by the rotary mechanism of the measuring device to obtain the measurement data of the workpiece. During the workpiece profile calculating step, the true value data of the workpiece is obtained by subtracting the rotational accuracy data from the workpiece measurement data.

Accordingly, since the master workpiece is not required to be shifted by a predetermined pitch relative to rotary table, the disadvantage of phase difference method, i.e. skilled work and numerous steps, can be eliminated. Further, since the compensation is conducted by processing the workpiece measurement data, highly reliable measurement data can be obtained without special arrangement for the measuring device. Further, since the calculation of the rotational accuracy data and the compensation of the rotational accuracy data to the workpiece measurement data can be conducted by an application program independent of the measuring device, the data can be more accurately compensated by conducting processing such as averaging processing of the master workpiece measurement data (processing for obtaining average value of a plurality of master workpiece measurement data obtained by repeatedly measuring the same position under the same condition) for reducing electric noise and dispersion of the measurement data according to measurement environment.

In the rotational accuracy compensation method of a measuring device according to the present invention, the method may include: a rotational accuracy data calculating step for measuring a profile of a master workpiece by a sensor while rotating a master workpiece of which profile data at a data acquisition position is value-specified in advance by a rotary mechanism of the measuring device and for subtracting the value-specified profile data from the master workpiece measurement data to obtain a rotational accuracy data of the rotary mechanism; a rotational accuracy data storing step for storing the rotational accuracy data obtained in the rotational accuracy data calculating step; a workpiece measurement data calculating step for measuring the profile of the workpiece by the sensor while rotating the workpiece by the rotary mechanism of the measuring device to obtain a measurement data of the workpiece; a workpiece measurement data storing step for storing the workpiece measurement data obtained in the workpiece measurement data calculating step; and a workpiece profile calculating step for reading out the workpiece measurement data and the rotational accuracy data stored in the respective storing steps and for subtracting the rotational accuracy data from the workpiece measurement data to obtain a true value data of the workpiece.

According to the above arrangement, since the rotational accuracy data storing step for storing the rotational accuracy data and the workpiece measurement data storing step for storing the workpiece measurement data are added, the rotational accuracy data and the workpiece measurement data can be separately acquired and stored at different time point and the true value data of the workpiece can be obtained by subtracting the rotational accuracy data from the workpiece measurement data as desired (as necessary).

In the rotational accuracy compensation method of the measuring device according to the present invention, a measurement jig provided with a cylindrical mount having a hemispherical master workpiece on an upper surface thereof and an origin-setting reference ball buried in the mount or the master workpiece with a part thereof being exposed may preferably be used, where, after a measurement origin is set by locating a sensor of the measuring device to a vertex of the reference ball, the sensor may preferably be located to the data acquisition position of the master workpiece and the master workpiece may preferably be measured while rotating the master workpiece by the rotary mechanism.

According to the above arrangement, the measurement jig having the mount on which the spherical master workpiece is provided and the origin-setting reference ball is used, where the measurement origin is set by locating the sensor of the measuring device to the origin-setting reference ball and, subsequently, the sensor is located to the data acquisition position of the master workpiece and the master workpiece is measured while rotating the master workpiece by the rotary mechanism. Therefore, the sensor can be accurately positioned to the data acquisition position of the workpiece, so that the master workpiece can be accurately measured.

BRIEF DESCRIPTION OF THE DRAWINGS

FIG. 2 is a block diagram showing a data processor of the aforesaid embodiment;

FIG. 3 is a flowchart showing a traverse linearity data calculating step and traverse linearity data storing step of the aforesaid embodiment;

FIG. 4 is a flowchart showing a workpiece measurement data calculating step and a workpiece measurement data storing step of the aforesaid embodiment;

FIG. 10 is a perspective view showing a roundness measuring device according to second embodiment of the present invention;

FIG. 12 is a flowchart showing a workpiece profile calculating step of the aforesaid embodiment; and FIGS. 13(A) and 13(B) are illustrations for showing relationship between a master workpiece and a probe of a sensor during rotational accuracy data calculating step in the aforesaid embodiment.

DETAILED DESCRIPTION OF PREFERRED EMBODIMENT(S)

An embodiment of the present invention will be described below with reference to the attached drawing.

[First Embodiment]

FIGS. 1 to 7 show a first embodiment of the present invention.

The present embodiment is an example of applying the present invention to a traverse linearity compensation method of a roundness measuring device.

Figure 1:
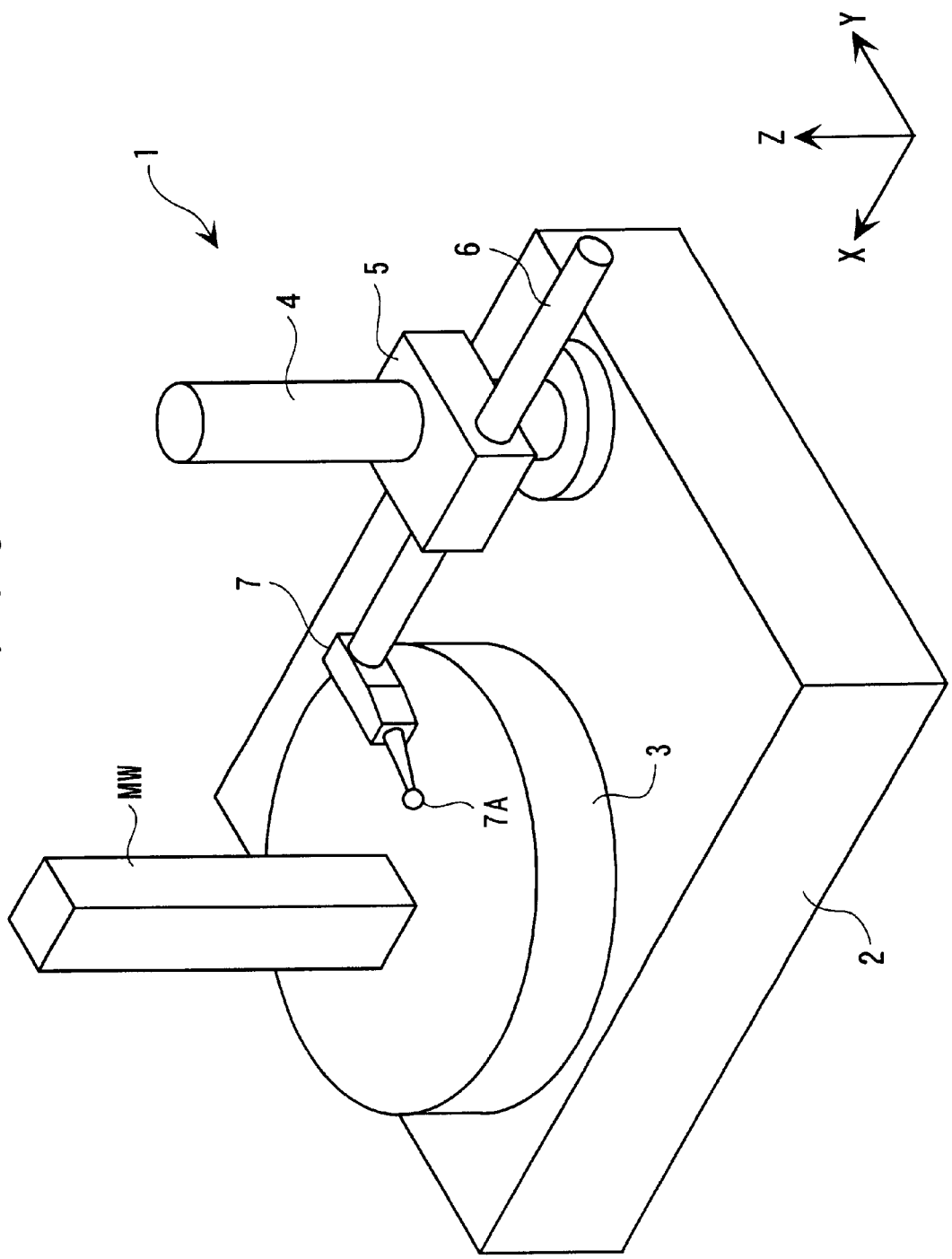
FIG. 1 is a perspective view of a roundness measuring device for illustrating first embodiment of the present invention.

FIG. 1 shows a roundness measuring device 1 of the present embodiment. The roundness measuring device 1 has a base 2, a rotary table 3 rotatably disposed around a perpendicular axis (Z-axis) on an upper side (left side in the figure) of the base 2, a column 4 disposed parallel to the Z-axis on the upper surface of the base 2 (on the right side in the figure), a slider 5 provided vertically movably (in Z-axis direction) along the column 4, an arm 6 provided to the slider 5 being advanceable and retractable in a direction orthogonal with the column 4 (X-axis direction), and a sensor 7 attached to a distal end of the arm 6 to be position-adjustable in Y-axis direction and having a probe 7A at a distal end thereof.

Incidentally, a rotation angle data of the rotary table 3, height position of the slider 5 (position data in the Z-axis direction), advancement and retraction of the arm 6 (position data in the X-axis direction) and adjustment amount of the sensor 7 (position data in the Y-axis direction) can be detected by a detector (not shown).

The column 4 and the slider 5 compose a linear movement mechanism (guide) for vertically (in the Z-axis direction) moving the sensor 7.

FIG. 2 shows a data processor 21 for acquiring and processing a measurement data from the roundness measuring device 1. The data processor 21 is composed of a controller 22, a memory 23 and a display 24.

Figure 5:
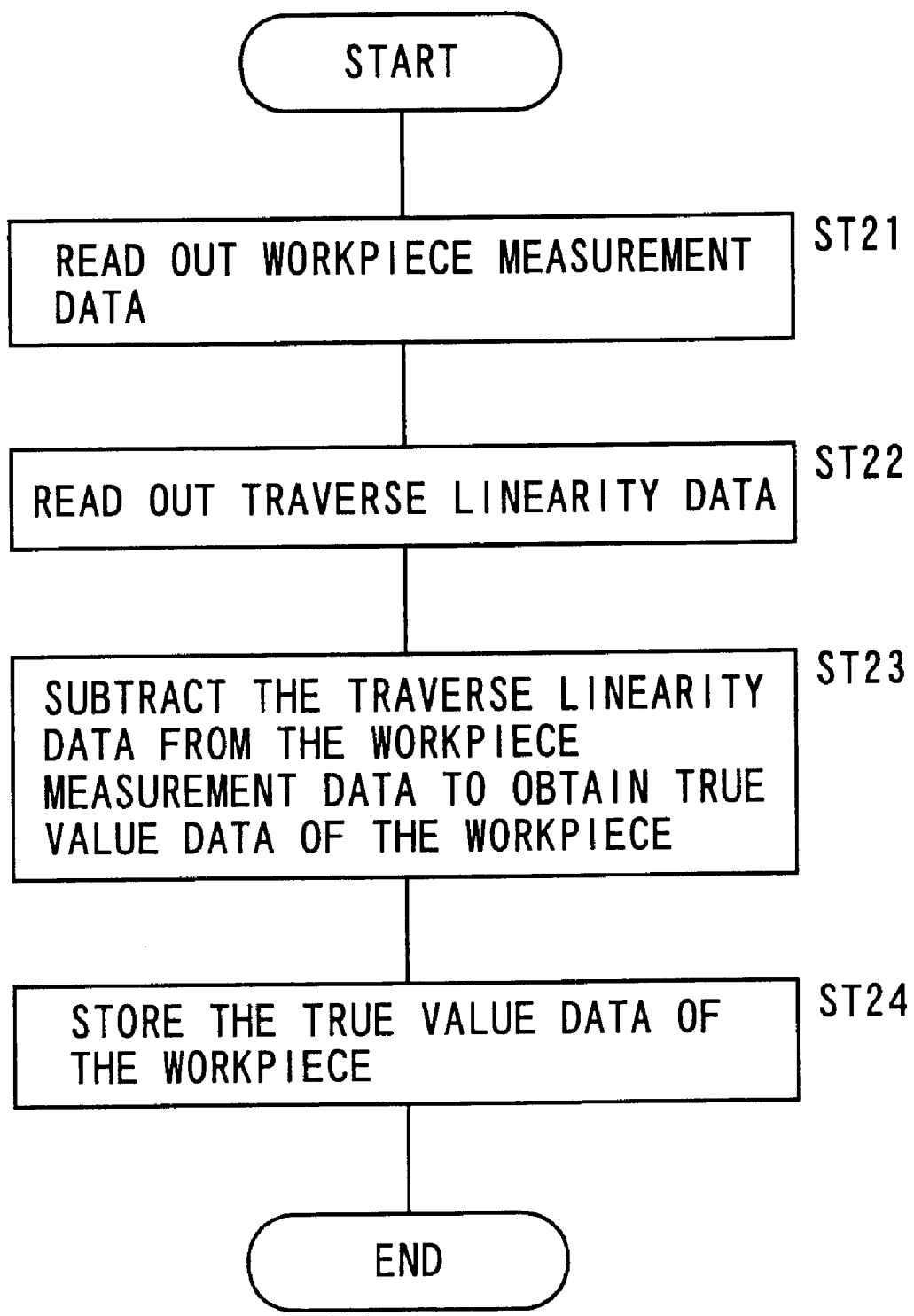
FIG. 5 is a flowchart showing a workpiece profile calculating step of the aforesaid embodiment.
Figure 6:
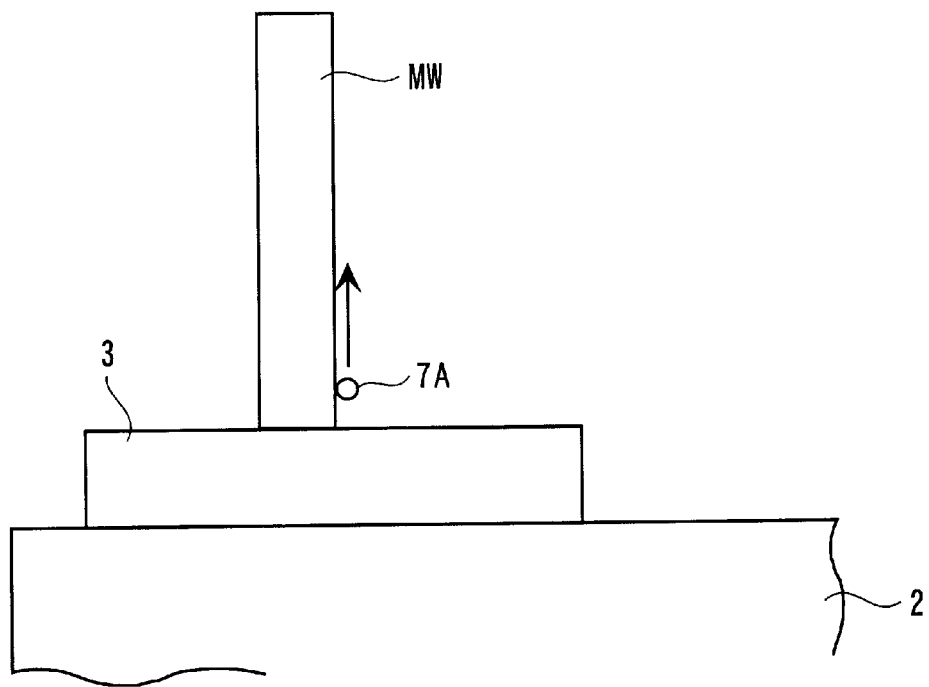
FIG. 6 is an illustration of relationship between the master workpiece and a probe of a sensor during the traverse linearity calculating step of the aforesaid embodiment.
Figure 7:
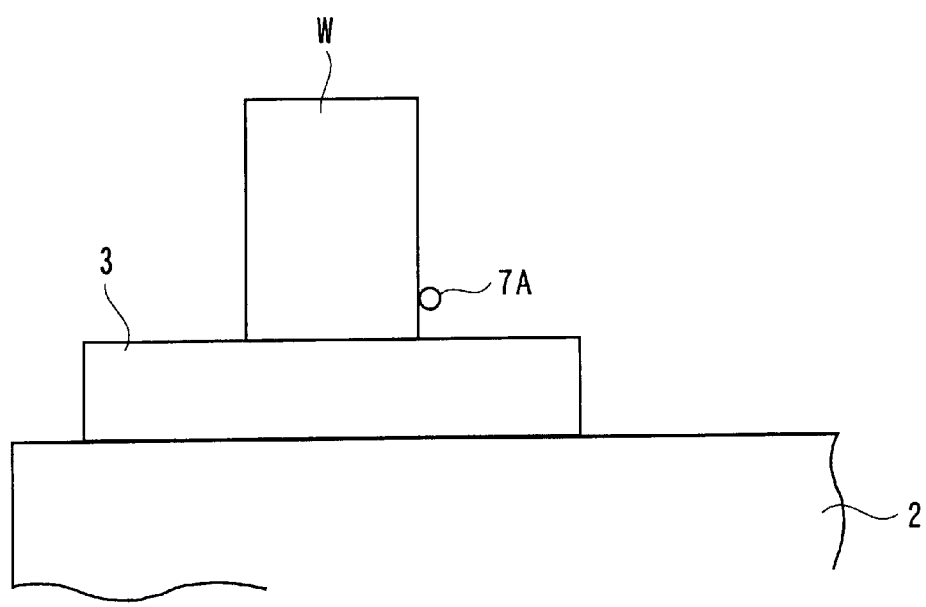
FIG. 7 is an illustration of relationship between the master workpiece and the probe of the sensor during the workpiece measurement data calculating step of the aforesaid embodiment.

The controller 22 has a function to perform respective steps (processes) shown in FIGS. 3 to 5 according to previously stored processing program. Specifically, the controller 22 has functions to perform: a traverse linearity data calculating step for acquiring a master workpiece measurement data in measuring a master workpiece of which profile data is value-specified by the roundness measuring device 1 and for subtracting the value-specified profile data from the master workpiece measurement data to obtain a traverse linearity data of the linear movement mechanism; a traverse linearity data storing step for storing the traverse linearity data obtained during the traverse linearity data calculating step (see FIG. 3); a workpiece measurement data calculating step for acquiring a workpiece measurement data when the workpiece is measured by the roundness measuring device 1; a workpiece measurement data storing step for storing the workpiece measurement data acquired by the workpiece measurement data calculating step (see FIG. 4); and a workpiece profile calculating step for reading out the stored workpiece measurement data and the traverse linearity data and for subtracting the traverse linearity data from the workpiece measurement data to obtain a true value data of the workpiece (see FIG. 5).

[Measurement by the First Embodiment]

Next, a measurement method of the present embodiment will be described below.

(Traverse Linearity Data Calculating Step and Traverse Linearity Data Storing Step)

A square pillar master workpiece MW (for example, an optical flat) of which profile data is value-specified in advance using a roundness measuring device 1 and a traverse linearity data of the linear movement mechanism is obtained by subtracting the value-specified profile data from the measurement data of the master workpiece and the traverse linearity data is stored.

Specifically, as shown in FIG. 3, the master workpiece MW is measured at step (ST) 1 in advance. After resting the master workpiece on the rotary table 3 while being held upright, the probe 7A of the sensor 7 is brought into contact with one side (measurement surface) of the master workpiece MW and the slider 5 is moved upwardly under the condition (see FIG. 6). Then, the probe 7A of the sensor 7 displaces in accordance with the profile of the master workpiece MW and the linearity of the linear movement mechanism, and the displacement is transmitted to the controller 22 of the data processor 21 together with the position data in respective axis directions. The controller 22 calculates the position of the measurement surface of the master workpiece MW based on the position of the slider 5 in the Z-axis direction, the advancement and retraction of the arm 6 (the position in X-axis direction), the adjustment amount of the sensor 7 (the position in Y-axis direction) and the displacement of the probe 7A, and the master workpiece measurement data is stored in the memory 23.

Next, the traverse linearity data is obtained by subtracting the previously measured profile data from the master workpiece measurement data. At this time, the profile data of the master workpiece MW is measured by another highly accurate measurement device and is stored in the memory 23 in advance. Accordingly, the master workpiece measurement data and the value-specified profile data of the master workpiece MW is read out from the memory 23, and the traverse linearity data is obtained by subtracting the profile data from the master workpiece measurement data, Subsequently, the obtained traverse linearity data is stored in the memory 23 at ST3.

(Workpiece Measurement Data Calculating Step and Workpiece Measurement Data Storing Step)

The workpiece W is measured by the roundness measuring device 1 to obtain the workpiece measurement data and the obtained workpiece measurement data is stored.

Specifically, as shown in FIG. 4, the workpiece W is initially measured at ST11. After resting the workpiece W vertically upright on the rotary table 3, the probe 7A of the sensor 7 is brought into contact with the measurement surface of the workpiece W to conduct measurement (see FIG. 7). At this time, the roundness or cylindricity is measured.

Subsequently, the workpiece measurement data is stored at ST12. Specifically, the workpiece measurement data measured at ST11 is transmitted to the data processor 21 and the workpiece is stored in the memory 23.

(Workpiece Profile Calculating Step)

The workpiece measurement data and the traverse linearity data stored in respective storing steps are read out and the true value data of the workpiece is obtained by subtracting the traverse linearity data from the workpiece measurement data.

Specifically, as shown in FIG. 5, the workpiece measurement data is read out from the memory 23 at ST21.

Next, the traverse linearity data is read out from the memory at ST22.

Next, the true value data of the workpiece is obtained by subtracting the traverse linearity data from the read out workpiece measurement data at ST23.

Next, at ST24, the obtained true value data is stored in the memory 23. In other words, the true value data obtained by compensating the workpiece measurement data with the traverse linearity of the linear movement mechanism is stored in the memory 23, highly reliable measurement data can be obtained.

[Effect of the First Embodiment]

According to the above-described embodiment, the true value data of the workpiece is obtained by: measuring the master workpiece MW of which profile data is value-specified by the roundness measuring device 1 and obtaining the traverse linearity data of the linear movement mechanism of the roundness measuring device by subtracting the previously measured profile data from the master workpiece measurement data during the traverse linearity data calculating step; obtaining the workpiece measurement data by separately measuring the workpiece using the roundness measuring device 1 during the workpiece measurement data calculating step; and, after these steps, obtaining the true value data of the workpiece by subtracting the traverse linearity data from the workpiece measurement data during the workpiece profile calculating step.

Accordingly, since only one measurement is necessary during the traverse linearity data calculating step, the disadvantage of the reversal method can be solved. Further, the sensor guide is not required to be the same, more accurate compensation result can be obtained. Further, since the compensation is conducted by processing the workpiece measurement data, highly reliable measurement data can be obtained without special arrangement for the measuring device. Further, since the calculation of the traverse linearity data and the compensation of the traverse linearity data to the workpiece measurement data can be conducted by an application program independent of the measuring device, the data can be more accurately compensated by conducting processing such as averaging processing of the master workpiece measurement data (processing for obtaining average value of a plurality of master workpiece measurement data obtained by repeatedly measuring the same position under the same condition) for reducing electric noise and dispersion of the measurement data according to measurement environment.

Further, since the traverse linearity data and the workpiece measurement data are separately stored in the memory 23, the traverse linearity data and the workpiece measurement data can be acquired and stored at different time point and the true value data of the workpiece can be obtained by subtracting the traverse linearity data from the workpiece measurement data as necessary.

[Modification of First Embodiment]

Figure 8:
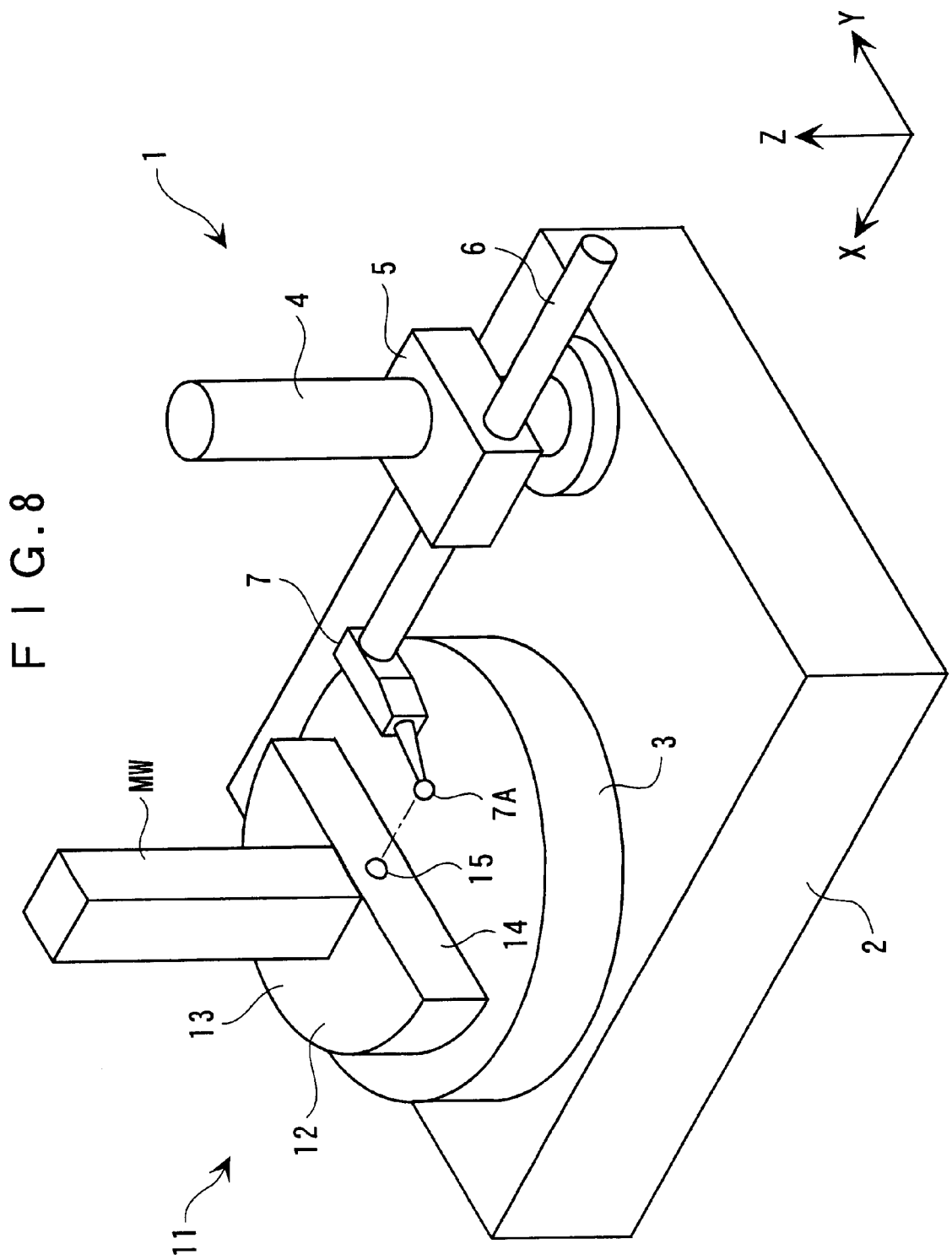
FIG. 8 is a perspective view showing a measurement using a measurement jig during the traverse linearity data calculating step of the aforesaid embodiment.

Incidentally, though the master workpiece MW or the workpiece W is directly rested on the rotary table 3 for measurement in the above-described first embodiment, the master workpiece MW may be rested on the rotary table 3 through a measurement jig 11 as shown in FIG. 8.

The measurement jig 11 has a mount 12. The mount 12 is half-cylinder formed by cutting a short cylinder in half at the center thereof and has a workpiece mounting surface 13 on an upper surface thereof, a reference ball 15 being half-buried at the center of the cut vertical reference surface 14.

The master workpiece MW is fixed on the workpiece mounting surface 13 by wringing.

In measuring the master workpiece MW, the master workpiece MW is initially rested on the workpiece mounting surface 13 of the mount 12 so that one side (measurement surface) of the master workpiece MW coincides with the vertical reference surface 14. Thereafter, the probe 7A of the sensor 7 is brought into contact with the reference ball 15 and the position of the sensor 7 is adjusted so that the probe 7A can capture the vertex of the reference ball 15 both vertical-wise and horizontal-wise. Subsequently, after a height counter (position sensor in Z-axis direction) is set "0" (origin setting), the probe 7A of the sensor 7 is brought into contact with a point on the surface of the master workpiece MW away from the measurement origin by a predetermined distance (e.g. lowermost position) and the sensor 7 is moved upwardly from the position to measure the vertical traverse linearity of the entire length of the master workpiece MW.

By measuring the traverse linearity of the master workpiece MW using the measurement jig 11, the locus of the master workpiece MW from a pre-designated position can be measured. In other words, since the master workpiece MW can be located on the rotary table 3 using the measurement jig 11 and the origin in height direction can be set by bringing the probe 7A of the sensor 7 into contact with the reference ball 15, the probe 7A of the sensor 7 can be located at a regular position of the master workpiece MW, thus measuring the locus of the master workpiece MW from a predetermined position.

Further, by using the measurement jig 11, the traverse linearity data obtained during the traverse linearity data calculating step can be easily verified by the reversal method.

Figure 9A:
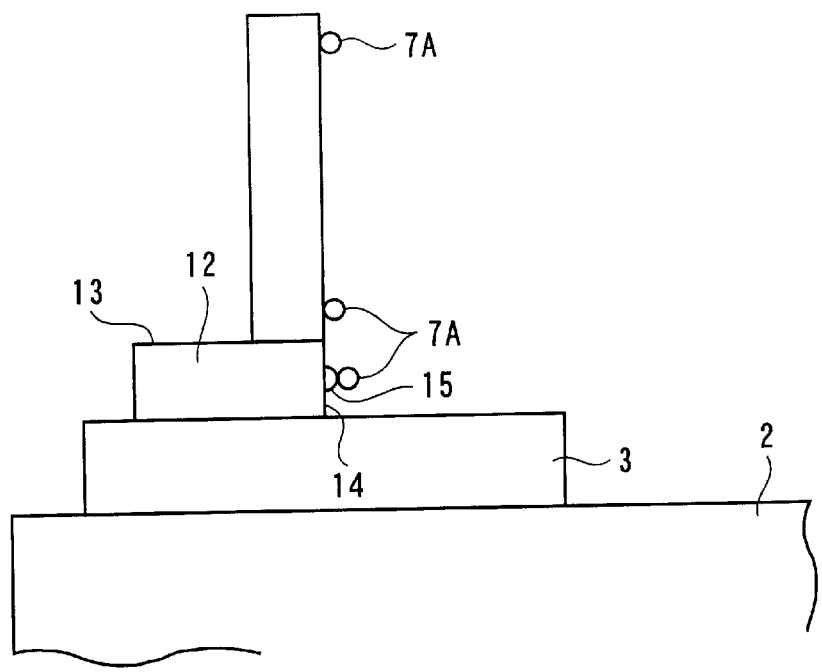
FIGS. 9(A) and 9(B) are illustrations of a process for verifying traverse linearity data using the measurement jig shown in FIG. 8.

For instance, one side of the master workpiece MW is measured in a condition shown in FIG. 9(A) (the same condition as in FIG. 8) and the measurement data is stored.

Figure 9B:
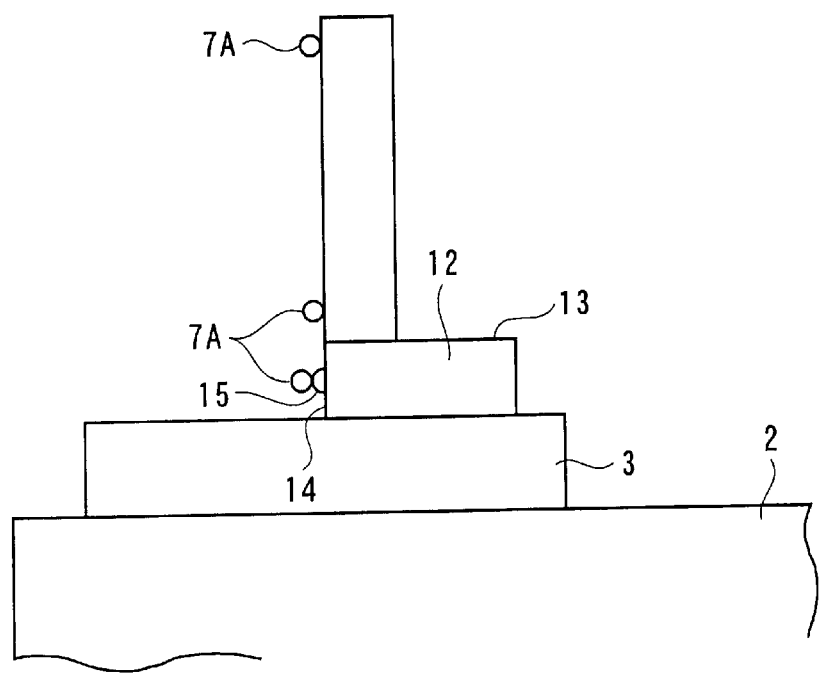

Subsequently, after the rotary table 3 is rotated by 180 degrees as shown in FIG. 9(B), the measurement origin is set and measurement is conducted to store the result measurement data. Since the side of the master workpiece MW is located on the central axis of the rotary table 3 even after rotating the rotary table 3 by 180 degrees, the side of the master workpiece MW can be located on the central axis of the rotary table 3 without requiring skilled work or repeated steps. In this case, the probe 7A of the sensor 7 is set inwardly.

Lastly, the first measurement data initially measured and the second measurement data subsequently measured are calculated to separately obtain the linearity of the master workpiece MW and the linearity of the linear movement mechanism.

Incidentally, in the above-described embodiment, either one of the traverse linearity data calculating step and the workpiece measurement data calculating step may be conducted in advance. For instance, the workpiece W may be measured in advance to obtain and store the workpiece measurement data and the traverse linearity data may be obtained by subsequently measuring the master workpiece MW, so that the workpiece measurement data can be compensated by the traverse linearity data at a desired time.

Further, the compensation result of the workpiece measurement data by the traverse linearity data (the true value data of the workpiece) may not be stored separately to the workpiece measurement data, but the compensation result of the workpiece measurement data with the traverse linearity data (the true value data of the workpiece) may be substituted and stored for the workpiece measurement data.

Further, though the origin-setting reference ball 15 is buried on the vertical reference surface 14 of the mount 12 of the above-described measurement jig 11, the reference ball may be buried on the master workpiece MW to obtain the same effect.

Further, though the above-described embodiment relates to the roundness measuring device, the present invention can be applied to any measuring device having a linear movement mechanism such as a roughness measuring device.

Further, the present invention can be also applied to compensation of secular change of traverse linearity of a measuring device as follows.

Since a traverse linearity reference (master workpiece) usable as a master workpiece is generally expensive, it is difficult for ordinary user to have the master workpiece for calibrating a measuring device. Especially, large-size traverse linearity reference which can be used for compensating traverse linearity of measuring device having long stroke (optical flat in the present embodiment) is extremely expensive.

Accordingly, in the first measurement, the traverse linearity data (a first traverse linearity data) is obtained using a master workpiece shown in the present embodiment. Immediately thereafter, generally available linearity reference (of any accuracy and not required to be value-specified: semi-master workpiece) is prepared and a workpiece measurement data (a first workpiece measurement data) is obtained by measuring the semi-master workpiece. The first traverse linearity data is subtracted therefrom to obtain the true value data of the linearity reference (semi-master workpiece), which is to be stored in the memory 23. In other words;

(first workpiece measurement data)−(first traverse linearity data)= true value data is obtained and is stored in the memory 23.

Subsequently, after a predetermined time (ordinarily, approximately one year) passes, the linearity reference (semi-master workpiece) is measured again, and the true value data is subtracted from the workpiece measurement data (second workpiece measurement data) to obtain a new traverse linearity data (second traverse linearity data). In other words:

(second workpiece measurement data)−(true value data)=second traverse linearity data is obtained.

Thus obtained second traverse linearity data is stored in the memory 23 and is used as a traverse linearity data until the next calibration.

According to the above method, since the master workpiece using highly accurate linearity reference has to be conducted only once at the initial stage and highly accurate traverse linearity data can be obtained as required by an inexpensive linearity reference (semi-master workpiece) thereafter, the traverse linearity of the measuring device can be inexpensively conducted.

[Second Embodiment]

FIGS. 10 to 13 show a second embodiment of the present invention.

The present embodiment is an application of the present invention to a rotational accuracy compensation method of a roundness measuring device.

FIG. 10 shows a roundness measuring device 1 according to the present embodiment. The roundness measuring device 1 is the same as the roundness measuring device 1 of the above-described first embodiment and detailed explanation of specific components is omitted herein.

In the present embodiment, a workpiece (not shown) is put on the rotary table 3 and the master workpiece MW is rested through a measurement jig 11.

The measurement jig 11 has a short-cylindrical mount 12 having a master workpiece MW on an upper surface 13 thereof, and a reference ball 15 buried and half-exposed on the periphery of the mount 12. The outer diameter of the mount 12 and the master workpiece MW are concentric. The master workpiece MW is formed in a hemisphere of which profile data acquisition position 14, here data of outer circumference having approximately the largest diameter, is previously measured.

Further, a rotary mechanism (guide) for rotating the workpiece or the master workpiece MW around the Z-axis is composed by the rotary table 3 and a drive mechanism (not shown) for rotating the rotary table 3.

The roundness measuring device 1 according to the present embodiment also has the data processor 21 in the same manner as the above-described first embodiment. The data processor 21 is composed of a controller 22, a memory 23 and a display 24 (see FIG. 2).

Figure 11:
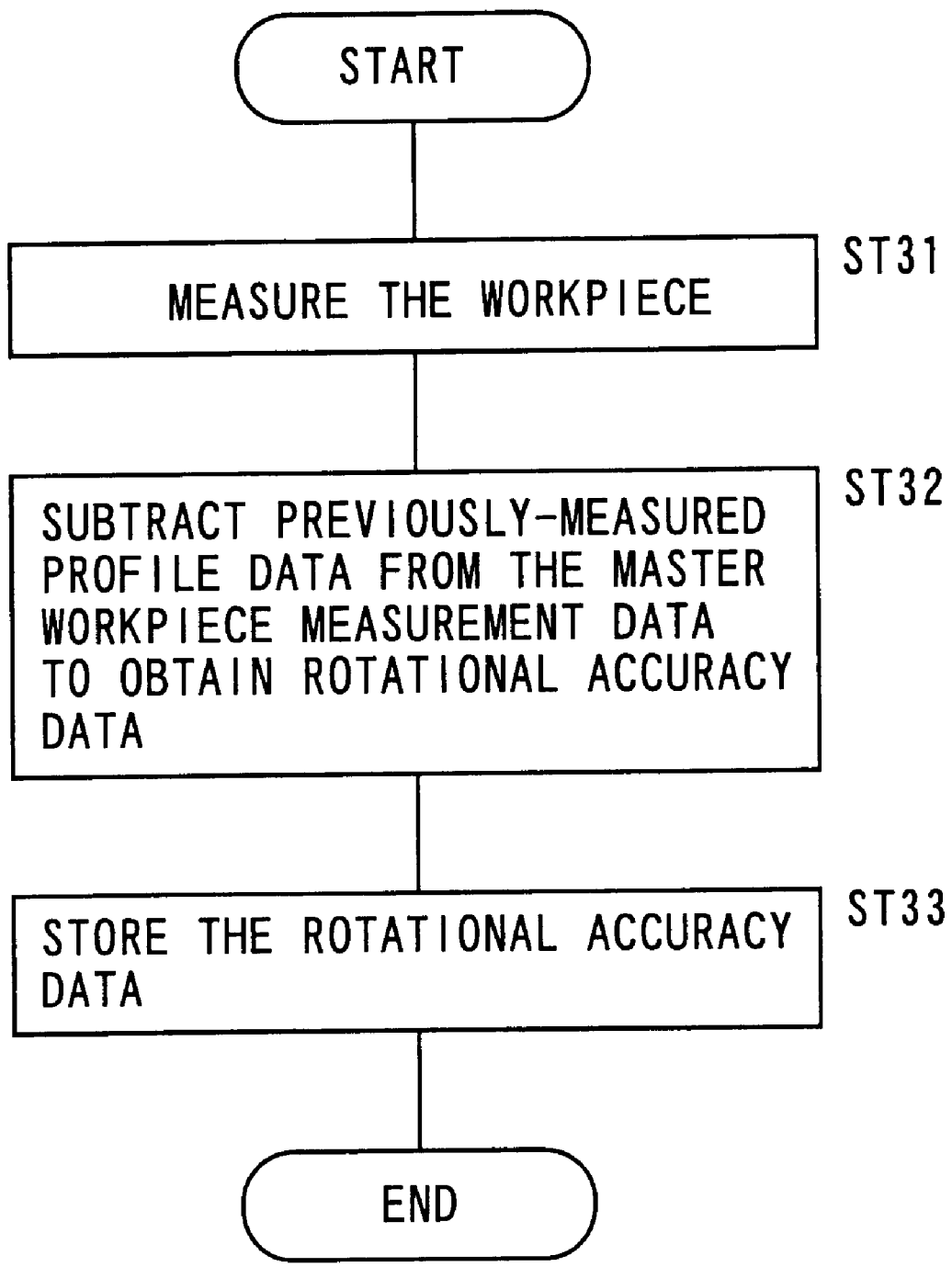
FIG. 11 is a flowchart showing a rotational accuracy data calculating step and a rotational accuracy data storing step of the aforesaid embodiment.

In the present embodiment, the controller 22 has a function to perform respective steps (processes) shown in FIGS. 11, 4 and 12 according to a previously stored processing program. Specifically, the controller 22 has functions to perform: a rotational accuracy data calculating step for acquiring a master workpiece measurement data when a master workpiece of which profile data at the data acquisition position 14 is value-specified by the roundness measuring device 1 and for subtracting the value-specified profile data from the master workpiece measurement data to obtain a rotational accuracy data of the rotary mechanism; a rotational accuracy data storing step for storing the rotational accuracy data obtained during the rotational accuracy data calculating step (see FIG. 11); a workpiece measurement data calculating step for acquiring a workpiece measurement data when the workpiece is measured by the roundness measuring device 1; a workpiece measurement data storing step for storing the workpiece measurement data acquired by the workpiece measurement data calculating step (see FIG. 4); and a workpiece profile calculating step for reading out the stored workpiece measurement data and the rotational accuracy data and for subtracting the rotational accuracy data from the workpiece measurement data to obtain a true value data of the workpiece (see FIG. 12).

[Measurement by the Second Embodiment]

Next, a measurement method of the present embodiment will be described below.

(Rotational accuracy Data Calculating Step and Rotational Accuracy Data Storing Step)

A hemispherical master workpiece MW of which profile data is previously measured at the predetermined data acquisition position 14 is measured using a roundness measuring device 1 at the predetermined data acquisition position 14, and a rotational accuracy data of the rotary mechanism is obtained by subtracting the previously measured profile data from the measurement data of the master workpiece and the rotational accuracy data is stored.

Specifically, as shown in FIG. 11, the master workpiece MW is measured at step (ST) 31 in advance. As shown in FIG. 13(A), the measurement jig 11 having the master workpiece MW is rested on the rotary table 3 and the outer diameter of the mount 12 is adjusted to be concentric with the axis center of the rotary table 3 while zero degree of the reference ball 15 and the rotary table 3 coincide with each other. Thereafter, the probe 7A of the sensor 7 is brought into contact with the reference ball 15 and the position of the sensor 7 is adjusted so that the probe 7A can capture the vertex of the reference ball 15 both vertical-wise and horizontal-wise. Subsequently, a height counter (position sensor in Z-axis direction) is set "0".

Thereafter, as shown in FIG. 13(B), the probe 7A of the sensor 7 is brought into contact into the data acquisition position 14 of the master workpiece MW and the roundness is measured by rotating the rotary table 3 under the above condition. Then, the probe 7A of the sensor 7 displaces in accordance with the profile of the master workpiece MW and the rotational accuracy of the rotary mechanism, and the displacement is transmitted to the controller 22 of the data processor 21 together with the position data in respective axis directions. The controller 22 calculates the profile of the master workpiece MW at the data acquisition position 14 based on the position of the slider 5 (the position in the Z-axis direction), the advancement and retraction of the arm 6 (the position in X-axis direction), the adjustment amount of the sensor 7 (the position in Y-axis direction) and the displacement of the probe 7A, and the master workpiece measurement data is stored in the memory 23.

Next, the rotational accuracy data is obtained by subtracting the value-specified profile data from the master workpiece measurement data at ST32. At this time, the profile data of the master workpiece MW at the data acquisition position 14 is measured by another highly accurate measurement device and is stored in the memory 23 in advance. Accordingly, the master workpiece measurement data and the value-specified profile data of the master workpiece MW is read out from the memory 23, and the rotational accuracy data is obtained by subtracting the profile data from the master workpiece measurement data.

Subsequently, the obtained rotational accuracy data is stored in the memory 23 at ST33.

(Workpiece Measurement Data Calculating Step and Workpiece Measurement Data Storing Step)

The workpiece W is measured by the roundness measuring device 1 to obtain the workpiece measurement data, and the workpiece measurement data is stored.

Specifically, as shown in FIG. 4 (see the first embodiment), the workpiece W is initially measured at ST11. After resting the workpiece W vertically upright on the rotary table 3, the probe 7A of the sensor 7 is brought into contact with the measurement surface of the workpiece W to conduct measurement (see FIG. 7 in the first embodiment). At this time, the roundness or cylindricity is measured.

Subsequently, the workpiece measurement data is stored at ST12. Specifically, the workpiece measurement data measured at ST11 is transmitted to the data processor 21 and the workpiece is stored in the memory 23.

(Workpiece Profile Calculating Step)

The workpiece measurement data and the rotational accuracy data stored in respective storing steps are read out and the true value data of the workpiece is obtained by subtracting the rotational accuracy data from the workpiece measurement data.

Specifically, as shown in FIG. 12, the workpiece measurement data is read out from the memory 23 at ST41.

Next, the rotational accuracy data is read out from the memory at ST42.

Next, the true value data of the workpiece is obtained by subtracting the rotational accuracy data from the read out workpiece measurement data at ST43.

Next, at ST44, the obtained true value data is stored in the memory 23. In other words, the true value data obtained by compensating the workpiece measurement data with the rotational accuracy of the rotary mechanism is stored in the memory 23, highly reliable measurement data can be obtained.

[Effect of the Second Embodiment]

According to the above-described embodiment, the true value data of the workpiece is obtained by: measuring the master workpiece MW of which profile data at the data acquisition position 14 is previously measured by the roundness measuring device 1 and obtaining the rotational accuracy data of the rotary mechanism of the roundness measuring device by subtracting the previously measured profile data from the master workpiece measurement data during the rotational accuracy data calculating step; obtaining the workpiece measurement data by separately measuring the workpiece using the roundness measuring device 1 during the workpiece measurement data calculating step; and, after these steps, obtaining the true value data of the workpiece by subtracting the rotational accuracy data from the workpiece measurement data during the workpiece profile calculating step.

Accordingly, since the master workpiece MW is not required to be shifted by a predetermined pitch relative to rotary table 3, the disadvantage of phase difference method, i.e. requiring skilled work and numerous steps can be eliminated. Further, since the compensation is conducted by processing the workpiece measurement data, highly reliable measurement data can be obtained without special arrangement of the measuring device. Further, since the calculation of the rotational accuracy data and the compensation of the rotational accuracy data to the workpiece measurement data can be conducted by an application program independent of the measuring device, the data can be more accurately compensated by conducting processing such as averaging processing of the master workpiece measurement data (processing for obtaining average value of a plurality of master workpiece measurement data obtained by repeatedly measuring the same position under the same condition) for reducing electric noise and dispersion of the measurement data according to measurement environment.

Since the rotational accuracy data and the workpiece measurement data are separately stored in the memory 23, the rotational accuracy data and the workpiece measurement data can be acquired and stored at different time point and the true value data of the workpiece can be obtained by subtracting the rotational accuracy data from the workpiece measurement data as necessary.

Further, since the master workpiece MW is measured using the measurement jig 11 having the mount 12 on which the spherical master workpiece MW is provided and the origin-setting reference ball 15, the locus of the predetermined data acquisition position 14 of the master workpiece MW can be constantly measured. In other words, since the origin in height direction can be set by bringing the probe 7A of the sensor 7 into contact with the reference ball 15 of the measurement jig 11, the sensor 7 can be accurately moved from the base position to the data acquisition position 14, so that the probe 7A can be located to be in contact with the data acquisition position 14 of the master workpiece MW. Accordingly, the predetermined locus of the data acquisition position 14 of the master workpiece MW can be measured.

[Modification of the Second Embodiment]

Incidentally, though the measurement jig 11 having the master workpiece MW is rested on the rotary table 3 and the master workpiece MW is measured under the above condition in the above-described second embodiment, the master workpiece MW may be directly rested on the rotary table 3 without using the measurement jig 11.

In the above-described embodiment, either one of the rotational accuracy data calculating step and the workpiece measurement data calculating step may be conducted in advance. For instance, the workpiece W may be measured in advance to obtain and store the workpiece measurement data and the rotational accuracy data may be obtained by subsequently measuring the master workpiece MW, so that the workpiece measurement data can be compensated by the rotational accuracy data at a desired time.

Further, the compensation result of the workpiece measurement data with the rotational accuracy data (the true value data of the workpiece) may not be stored separately to the workpiece measurement data, but the compensation result of the workpiece measurement data by the rotational accuracy data (the true value data of the workpiece) may be substituted and stored for the workpiece measurement data.

Further, though the origin-setting reference ball 15 is buried on the vertical reference surface 14 of the mount 12 of the above-described measurement jig 11, the reference ball may be buried on the master workpiece MW to obtain the same effect.

Further, though the above-described embodiment relates to the roundness measuring device, the present invention can be applied to any measuring device having a rotary mechanism.

Further, the present invention can be also applied for compensating secular change of rotational accuracy of a measuring device as follows.

Since a hemisphere reference (master workpiece) usable as a master workpiece is generally expensive, it is difficult for ordinary user to have the master workpiece for calibrating a measuring device.

Accordingly, in the first measurement, the rotational accuracy data (a first rotational accuracy data) is obtained using a master workpiece shown in the present embodiment. Immediately thereafter, generally available linearity reference (of any accuracy and not required to be value-specified: semi-master workpiece) is prepared and a workpiece measurement data (a first workpiece measurement data) is obtained by measuring the semi-master workpiece. The first rotational accuracy data is subtracted therefrom to obtain the true value data of the hemisphere reference (semi-master workpiece) to be stored in the memory 23. In other words;

(first workpiece measurement data)−(first rotational accuracy data)=true value data is obtained and is stored in the memory 23.

Subsequently, after a predetermined time (ordinarily, approximately one year) passes, the hemisphere reference (semi-master workpiece) is measured again, and the true value data is subtracted from the workpiece measurement data (second workpiece measurement data) to obtain a new rotational accuracy data (second rotational accuracy data). In other words:

(second workpiece measurement data)−(true value data)=second rotational accuracy data is obtained.

Thus obtained second rotational accuracy data is stored in the memory 23 and is used as a rotational accuracy data until the next calibration.

According to the above method, since the master workpiece using highly accurate hemisphere reference has to be conducted only once at the initial stage and, thereafter, highly accurate rotational accuracy data can be obtained as required by an inexpensive hemisphere reference (semi-master workpiece), the rotational accuracy calibration of the measuring device can be inexpensively conducted.

What is claimed is:

1. A traverse linearity compensation method of a measuring device having a linear movement mechanism, the method comprising:

a traverse linearity data calculating step for measuring a master workpiece of which profile data is value-specified in advance by a master workpiece measuring device for measuring errors in the master workpiece while moving a sensor by the linear movement mechanism of the measuring device and for subtracting the value-specified profile data from the master workpiece measurement data to obtain a traverse linearity data of the linear movement mechanism;

a workpiece measurement data calculating step for measuring a workpiece while moving the sensor by the linear movement mechanism of the measuring device to obtain a measurement data of the workpiece; and a workpiece profile calculating step for subtracting the traverse linearity data from the workpiece measurement data to obtain a true value data of the workpiece.

2. The traverse linearity compensation method of a measuring device having a linear movement mechanism according to claim 1, further comprising:

a traverse linearity data storing step for storing the traverse linearity data obtained in the traverse linearity data calculating step;

a workpiece measurement data storing step for storing the workpiece measurement data obtained in the workpiece measurement data storing step; and a data reading and workpiece profile calculating step for reading out the stored workpiece measurement data and the traverse linearity data stored in the respective storing steps, wherein the workpiece profile calculating step subtracts the traverse linearity data from the workpiece measurement data to obtain a true value data of the workpiece.

3. The traverse linearity compensation method of a measuring device according to claim 1, wherein a measurement jig having a mount provided with a workpiece mounting surface and a origin-setting reference ball buried in the mount or the master workpiece with a part thereof being exposed is used in the traverse linearity data calculating step, and wherein, after a square-pillar master workpiece is rested on the workpiece mounting surface of the mount and a measurement origin is set by locating the sensor of the measuring device on a vertex of the reference ball, the sensor is moved along a side of the master workpiece by the linear movement mechanism to measure the master workpiece.

4. The traverse linearity compensation method of a measuring device according to claim 3, wherein the mount is formed in a half-cylinder having a vertical reference surface orthogonal with the workpiece mounting surface, the reference ball being buried on the vertical reference surface with a part thereof being exposed.

5. A rotational accuracy compensation method of a measuring device having a rotary mechanism, the method comprising:

a rotational accuracy data calculating step for measuring a profile of a master workpiece by a sensor while the rotary mechanism of the measuring device rotates a master workpiece of which profile data at a data acquisition position is value-specified in advance by a master workpiece measuring device for measuring errors in the master workpiece and for subtracting the value-specified profile data from the master workpiece measurement data to obtain a rotational accuracy data of the rotary mechanism;

a workpiece measurement data calculating step for measuring the profile of the workpiece by the sensor while rotating the workpiece by the rotary mechanism, of the measuring device to obtain a measurement data of the workpiece; and a workpiece profile calculating step for subtracting the rotational accuracy data from the workpiece measurement data to obtain a true value data of the workpiece.

6. The rotational accuracy compensation method of a measuring device having a rotary mechanism according to claim 5, further comprising:

a rotational accuracy data storing step for storing the rotational accuracy data obtained in the rotational accuracy data calculating step;

a workpiece measurement data storing step for storing the workpiece measurement data obtained in the workpiece measurement data calculating step; and a data reading and workpiece profile calculating step for reading out the workpiece measurement data and the rotational accuracy data stored in the respective storing steps, wherein the workpiece profile calculating step subtracts the rotational accuracy data from the workpiece measurement data to obtain a true value data of the workpiece.

7. The rotational accuracy compensation method according to claim 5, wherein a measurement jig provided with a cylindrical mount having a hemispherical master workpiece on an upper surface thereof and an origin-setting reference ball buried in the mount or the master workpiece with a part thereof being exposed is used, and wherein, after a measurement origin is set by locating a sensor of the measuring device to a vertex of the reference ball, the sensor is located to the data acquisition position of the master workpiece and the master workpiece is measured while rotating the master workpiece by the rotary mechanism.

* * * * *